United States Patent
Nunes (10) Patent No.: US 9,438,360 B2
(45) Date of Patent: Sep. 6, 2016

(54) SYSTEM AND METHOD FOR PROVIDING AN AUDIO COMPONENT OF A MULTIMEDIA CONTENT DISPLAYED ON AN ELECTRONIC DISPLAY DEVICE TO ONE OR MORE WIRELESS COMPUTING DEVICES

(75) Inventor: Bryan Nunes, Hollister, CA (US)

(73) Assignee: Signet Media, Inc., Santa Clara, CA (US)

( * ) Notice: Subject to any disclaimer, the term of this patent is extended or adjusted under 35 U.S.C. 154(b) by 0 days.

(21) Appl. No.: 13/004,847

(22) Filed: Jan. 11, 2011

(65) Prior Publication Data

US 2011/0170004 A1    Jul. 14, 2011

Related U.S. Application Data

(60) Provisional application No. 61/294,085, filed on Jan. 11, 2010.

(51) Int. Cl.
| | |
|---|---|
| *H04H 20/61* | (2008.01) |
| *H04N 21/41* | (2011.01) |
| *H04L 29/06* | (2006.01) |
| *H04W 4/06* | (2009.01) |
| *H04W 4/20* | (2009.01) |
| *G06Q 30/02* | (2012.01) |

(52) U.S. Cl.
CPC .......... *H04H 20/61* (2013.01); *H04L 65/4015* (2013.01); *H04L 65/605* (2013.01); *H04L 69/28* (2013.01); *H04N 21/4126* (2013.01); *G06Q 30/0241* (2013.01); *H04W 4/06* (2013.01); *H04W 4/206* (2013.01)

(58) Field of Classification Search
CPC ............ H04H 20/61; H04N 21/43637; H04L 65/4015

USPC .................. 709/201, 203, 231, 247; 710/68; 719/322, 324; 370/324, 276, 310, 902
See application file for complete search history.

(56) References Cited

U.S. PATENT DOCUMENTS

| | | | | |
|---|---|---|---|---|
| 5,418,577 | A * | 5/1995 | Bagley | H04H 20/02 348/729 |
| 7,609,173 | B2 * | 10/2009 | Vanderwall | G06Q 20/202 340/901 |
| 8,300,079 | B2 * | 10/2012 | Tian | H04N 7/14 348/14.01 |
| 2004/0071088 | A1 * | 4/2004 | Curcio et al. | 370/235 |
| 2004/0123103 | A1 | 6/2004 | Risan et al. | |
| 2004/0193488 | A1 * | 9/2004 | Khoo | G06Q 30/02 705/14.52 |
| 2004/0215692 | A1 * | 10/2004 | Vasudevan | H04L 67/16 709/201 |
| 2005/0019020 | A1 * | 1/2005 | Sato et al. | 386/96 |
| 2006/0075439 | A1 * | 4/2006 | Vance | H04L 29/06027 725/81 |

(Continued)

*Primary Examiner* — Andrew Lai
*Assistant Examiner* — Jamaal Henson
(74) *Attorney, Agent, or Firm* — David E. Crites (57) ABSTRACT

A system and method for providing an audio component of a multimedia content playing on an electronic display device to one or more wireless computing devices utilizes a synchronization player application of the electronic display device to display a visual component of the multimedia content on a display of the electronic display device and to extract the audio component from the multimedia content. The extracted audio component of the multimedia content is packetized into data packets and broadcast into a network so that the data packets can be received by the wireless computing devices to play the audio component of the multimedia content in synchronization with the visual component of the multimedia content being displayed on the display of the electronic display device.

24 Claims, 5 Drawing Sheets

(56) References Cited

U.S. PATENT DOCUMENTS

| | | | |
|---|---|---|---|
| 2006/0104600 A1* | 5/2006 | Abrams | H04N 5/247 386/223 |
| 2007/0079383 A1* | 4/2007 | Gopalakrishnan | 726/26 |
| 2008/0183853 A1 | 7/2008 | Manion et al. | |
| 2008/0209066 A1* | 8/2008 | Spio et al. | 709/231 |
| 2008/0270235 A1* | 10/2008 | Yoon | G06Q 30/02 705/14.58 |
| 2009/0003600 A1 | 1/2009 | Chen et al. | |
| 2009/0007193 A1* | 1/2009 | Correa | H04H 20/62 725/76 |
| 2009/0091655 A1* | 4/2009 | Russell | H04N 21/2368 348/515 |
| 2009/0300241 A1* | 12/2009 | Young et al. | 710/68 |
| 2011/0040760 A1* | 2/2011 | Fleischman | G06Q 30/02 707/737 |
| 2011/0078729 A1* | 3/2011 | LaJoie | G11B 27/28 725/36 |

* cited by examiner

SYSTEM AND METHOD FOR PROVIDING AN AUDIO COMPONENT OF A MULTIMEDIA CONTENT DISPLAYED ON AN ELECTRONIC DISPLAY DEVICE TO ONE OR MORE WIRELESS COMPUTING DEVICES

CROSS REFERENCE TO RELATED APPLICATION

This application is entitled to the benefit of U.S. Provisional Patent Application Ser. No. 61/294,085, filed on Jan. 11, 2010, which is incorporated herein by reference.

BACKGROUND OF THE INVENTION

With advances in flat panel technology and price reduction of flat panel displays, conventional Cathode Ray Tube (CRT) displays have been almost completely replaced by flat panel displays. Users typically favor flat panel displays, such as plasma and LCD displays, over CRT displays because flat panel displays are less heavy and take up less space in comparison to CRT displays. Thus, flat panel monitors have replaced CRT monitors for desktop computers and flat panel televisions have replaced CRT televisions.

As flat panel display became ubiquitous, the prices of flat panel displays have dropped considerably. As a result, flat panel displays are now used to visually transmit information to the public in both indoor and outdoor environments, replacing signs, billboards and other static displays. The information displayed on these flat panel "signage" displays may include visual advertisements, visual public announcements and other visual information, which may be pertinent or related to the surrounding environment of the flat panel "signage" displays. As an example, a flat panel "signage" display located in front of an exhibit in a museum may play a video or a multimedia presentation describing that exhibit.

A disadvantage of the flat panel "signage" displays is that typically no audio is provided with the visual information displayed on the flat panel "signage" displays. Even when audio is provided through one or more speakers of a flat panel "signage" display, noise from the surrounding environment may interfere with the audio from the flat panel "signage" display.

Therefore, there is a need for a system and method to provide accompanying audio to visual information displayed on a flat panel "signage" displays to one or more viewers.

SUMMARY OF THE INVENTION

A system and method for providing an audio component of a multimedia content playing on an electronic display device to one or more wireless computing devices utilizes a synchronization player application of the electronic display device to display a visual component of the multimedia content on a display of the electronic display device and to extract the audio component from the multimedia content. The extracted audio component of the multimedia content is packetized into data packets and broadcast into a network so that the data packets can be received by the wireless computing devices to play the audio component of the multimedia content in synchronization with the visual component of the multimedia content being displayed on the display of the electronic display device.

A method for providing an audio component of a multimedia content playing on an electronic display device to one or more wireless computing devices in accordance with an embodiment of the invention comprises establishing a connection between a wireless computing device and the electronic display device via a network, displaying a visual component of the multimedia content on a display of the electronic display device, extracting the audio component from the multimedia content, packetizing the extracted audio component of the multimedia content into data packets for transmission, broadcasting the data packets containing the extracted audio component into the network so that the data packets can be received by the wireless computing device to play the audio component of the multimedia content in synchronization with the visual component of the multimedia content being displayed on the display of the electronic display device.

A system in accordance with an embodiment of the invention comprises a plurality of electronic display devices. Each electronic display device comprises a display, a synchronization player application and a network interface. The synchronization player application is configured to display a visual component of a multimedia content on the display. The synchronization player application is also configured to extract an audio component from the multimedia content. The network interface is configured to packetize the extracted audio component of the multimedia content into data packets and transmit the data packets containing the extracted audio component into a network so that the data packets can be received by one or more wireless computing devices to play the audio component of the multimedia content in synchronization with the visual component of the multimedia content being displayed on the display of the electronic display device.

A system in accordance with another embodiment of the invention comprises a network, an electronic display device and a wireless computing device. The electronic display device is connected to the network. The electronic display device comprises a display, a synchronization player application and a network interface. The synchronization player application is configured to display a visual component of a multimedia content on the display. The synchronization player application is also configured to extract an audio component from the multimedia content. The network interface is configured to packetize the extracted audio component of the multimedia content into data packets and transmit the data packets containing the extracted audio component into the network. The wireless computing device is connected to the electronic display device via the network to receive the data packets containing the extracted audio component. The wireless computing device comprises a synchronization client application configured to process the data packets to play the audio component of the multimedia content in synchronization with the visual component of the multimedia content being displayed on the display of the electronic display device.

Other aspects and advantages of the present invention will become apparent from the following detailed description, taken in conjunction with the accompanying drawings, illustrated by way of example of the principles of the invention.

DETAILED DESCRIPTION

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
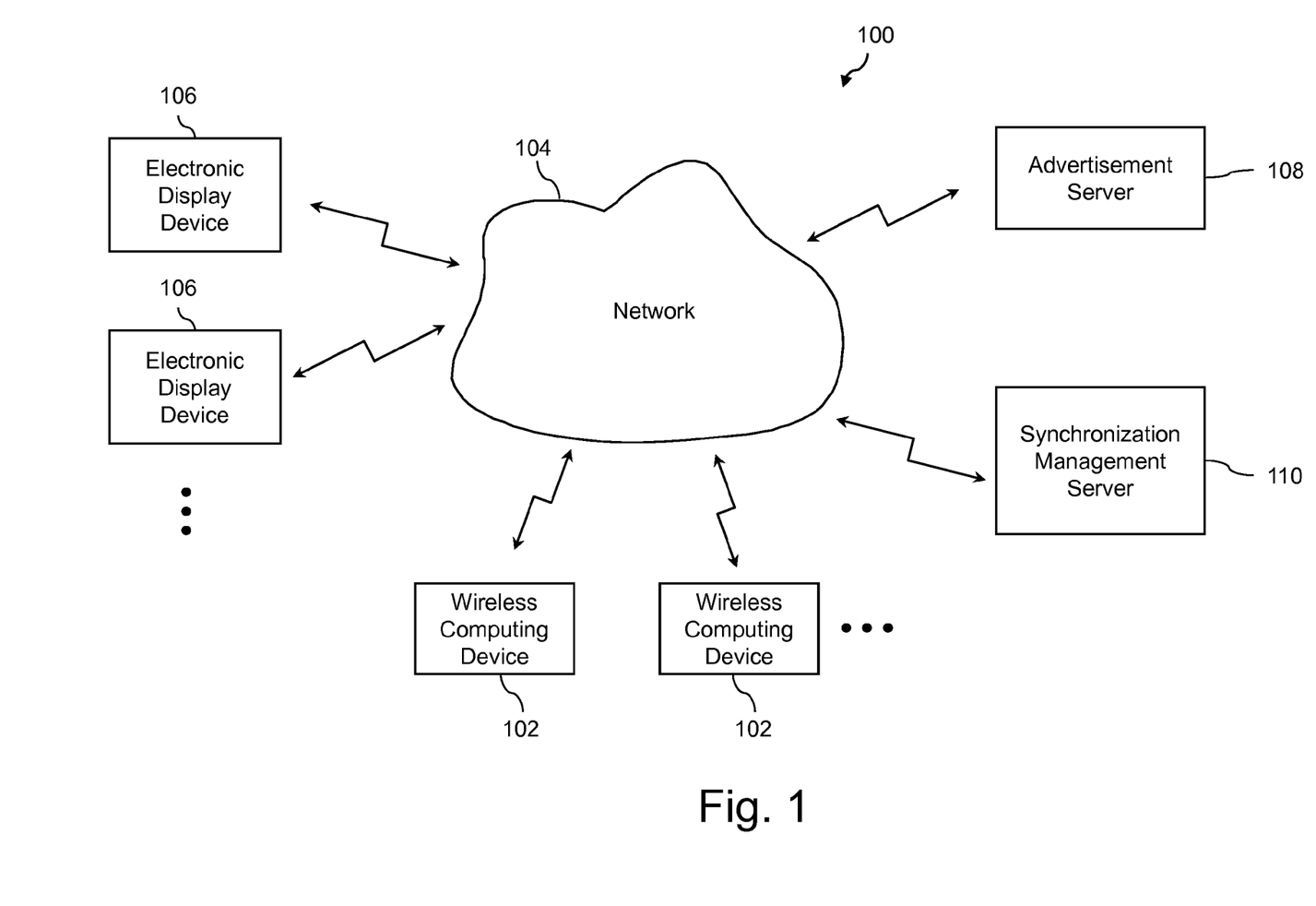
FIG. 1 is a block diagram of a multimedia synchronization system in accordance with an embodiment of the invention.

With reference to FIG. 1, a multimedia synchronization system 100 for providing an audio component of a multimedia content displayed on a display device to one or more wireless computing devices in accordance with an embodiment of the invention is described. As used herein, a multimedia content refers to any multimedia content, which includes a visual portion or component, which may comprise, for example, videos, digital images, digital presentation slides and/or webpages, and an accompanying audio portion or component, wherein the audio component is meant to be played along with the visual component. That is, the visual component and the audio component of the multimedia content are created to be played in synchronization. As described in more detail below, the multimedia synchronization system 100 is designed so that one or more viewers of a multimedia content can enjoy both the visual component and the accompanying audio component of the multimedia content in a personalized manner.

As shown in FIG. 1, the multimedia synchronization system 100 includes a number of wireless computing devices 102, a network 104, a number of electronic display devices 106, an advertisement server 108 and a synchronization management server 110. The wireless computing devices 102 can be any type of wireless network-enabled computing devices, i.e., wireless devices that can connect to the network 104. As an example, the wireless computing devices 102 may be network-enabled wireless mobile computers, such as notebook, netbook and/or tablet computers, or network-enabled phone devices, such as smartphones. In some embodiments, the wireless computing devices 102 may be WiFi™-enabled devices that can wirelessly connect to the network 104 via WiFi™ hotspots. The wireless computing devices 102 of the multimedia synchronization system 100 are described in more detail below.

The network 104 of the multimedia synchronization system 100 can be any computer network that provides communication connections between at least the wireless computing devices 102 and the electronic display devices 106. In an embodiment, the network 104 includes the Internet and any other smaller networks that connect to the Internet. The network 104 allows the wireless computing devices 102 to receive audio component data from one or more of the electronic display devices 106 via the network, and allows communications between the advertisement server 108, the synchronization management server 110 and the electronic display devices 106. In other embodiments, the network 104 may include at least one short range communication connection between one or more of the wireless computing devices 102 and one or more of the electronic display devices 106, such as Bluetooth™ connection or a radio frequency identification (RFID) connection.

The electronic display devices 106 of the multimedia synchronization system 100 operate to play at least the visual components of multimedia contents, which also include audio components. The multimedia contents may be downloaded via the network 104 as computer files from one or more content sources, such as the advertisement server 108, the synchronization management server 110 or other sources connected to the network, and stored in the electronic display devices 106. The multimedia contents can then be independently or collectively played on the electronic display devices 106. That is, the electronic display devices 106 can operate as independent devices, playing any multimedia content accessible by the electronic display devices, or as dependent devices, playing the same multimedia contents at the same time. The electronic display devices 106 may play the multimedia contents based on one or more predefined schedules or in a random manner. In some embodiments, the multimedia contents may be streamed via the network 104 from one or more content sources to the electronic display devices and played in real time by the electronic display devices.

In addition to playing the multimedia contents, which includes at least displaying the visual components of the multimedia contents, the electronic display devices 106 extract the audio components of the multimedia contents and streams the audio components or into the network 104 in a multicast or unicast mode. The viewers of the visual components of the multimedia contents playing on the electronic display devices 106 can then listen to the accompanying audio components using their wireless computing devices, such as the wireless computing devices 102, by accessing the streamed audio components. As described in more detail below, a viewer is able to select a particular electronic display device on his/her wireless computing device to receive the audio component for the multimedia content being displayed on that electronic display device. Thus, the viewer is able to listen to the audio component of the multimedia content on the wireless computing device as the viewer is watching the visual component of the multimedia content on the electronic display device.

Figure 2:
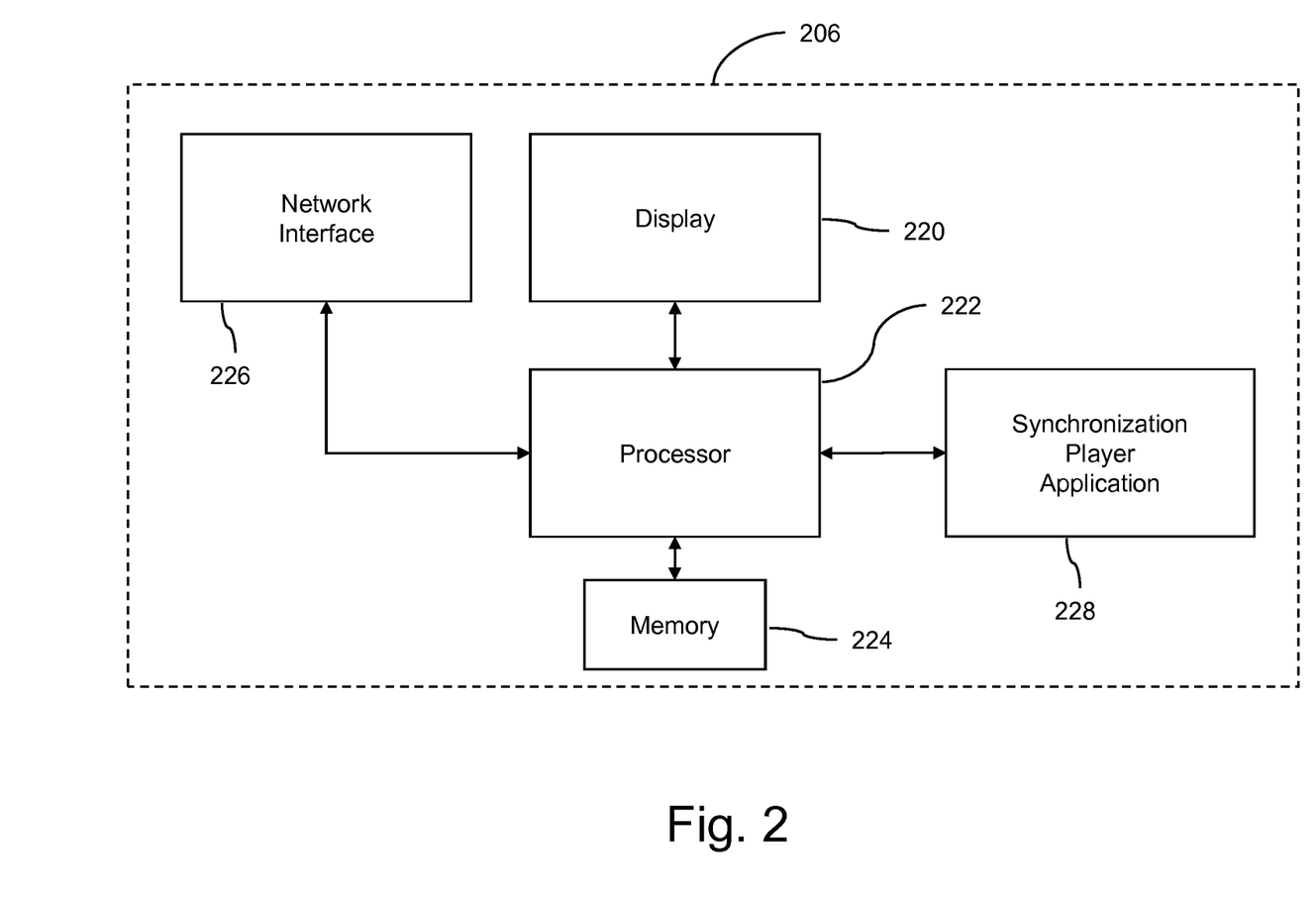
FIG. 2 is a block diagram of an example of electronic display devices in the system of FIG. 1 in accordance with an embodiment of the invention.

Turning now to FIG. 2, components of an electronic display device 206 in accordance with an embodiment of the invention are shown. The electronic display device 206 is an example of the electronic display devices 106 shown in FIG. 1. In an embodiment, the electronic display device 206 may be part of a digital signage, which is a network of electronic displays that can be remotely managed, designed and controlled for display at a plurality of locations. Digital signage can refer to the targeted transmission of audio and video content to a controlled and specific output device. In most installations, data is sent from one or more different locations and stored or streamed to a local "player" appliance based on a predefined schedule. Digital signage networks are utilized in various markets such as airports, retail stores, museums, and outdoor venues, such as Times Square or Yankee Stadium. Each display within these environments is presented to viewers to appear as an autonomous device. However, in other embodiments, the electronic display 206 may be a standalone device, and not part of a digital signage.

As shown in FIG. 2, the electronic display device 206 includes a display 220, a processor 222, memory 224, a network interface 226 and a synchronization player application 228. In addition to these components, the electronic display device 206 may include components commonly found in a personal computer or a display device of a digital signage. However, these other components of the electronic display device 206 are not shown and described herein so as to not obscure the inventive features of the multimedia synchronization system 100.

The display 220 of the electronic display device 206 is used to display the visual component of a multimedia content being played by the electronic display device. The display 220 can be any type of a display, such as a plasma display, an LCD display or an LED display. In some embodiments, the electronic display device may be an array of displays, which may independently display different visual contents or may display portions of a single visual content to display the entire visual content using multiple displays. The size of the display 220 can vary, for example, from few inches to hundreds of inches.

The processor 222 of the electronic display device 206 may be a general-purpose digital processor, such as a microprocessor or microcontroller. In other embodiments, the processor 222 may be a special-purpose processor, such as a digital signal processor. In still other embodiments, the processor 222 may be another type of controller, a field programmable gate array (FPGA), or an Application Specific Integrated Circuit (ASIC). Although the electronic display device 206 is shown and described as having one processor, the electronic display device may include multiple processors in other embodiments.

The memory 224 of the electronic display device 206 can be any type of computer memory, such as read only memory (ROM), flash memory, random access memory (RAM) or a hard disk drive. Although the electronic display device 206 is shown and described as having one memory, the electronic display device may include multiple memories in other embodiments.

The network interface 226 of the electronic display device 206 allows the electronic display device to connect to the network 104. As a result, the electronic display device 206 can stream the audio component of a multimedia content being played on the electronic display device into the network 104 so that one or more wireless computing devices 102 can receive the streamed audio component. As an example, the network interface 226 may be a wired or wireless network interface controller card, such as an Ethernet card.

The synchronization player application 228 of the electronic display device 206 operates to display the visual component of a multimedia content on the display 220 and to stream the audio component of the multimedia content through the network 104 to one or more wireless computing devices "connected" to the electronic display device. In embodiments in which the electronic display device 206 is part of a digital signage, the synchronization player application 228 is designed to be an agnostic application that can run in parallel with the existing digital signage software running on the electronic display device. This allows the synchronization player application 228 to be an activated module that can be sold and deployed into existing digital signage networks.

In operation, the synchronization player application 228 extracts an audio component of a multimedia content by stripping the audio component from one or more computer files that contain the multimedia content. In an embodiment, the synchronization player application 228 captures the raw uncompressed audio data of a multimedia content from the kernel level of the hardware of the electronic display device 206. The synchronization player application 228 has a custom driver that connects to a virtual audio card, which routes inputs and outputs of audio on the chipset. The virtual audio card of the synchronization player application 228 captures the audio data, timestamps the audio data and encapsulates the audio data. This is achieved by exposing a part of the memory that allows data to be written directly to the virtual sound card. The audio data is then directed to the network interface 226, e.g., an Ethernet card, where the audio data is transmitted to the network 104 in a packetized manner in either a multicast or unicast mode. In an embodiment, the audio data is packetized and transmitted as Internet Protocol (IP) packets.

The synchronization player application 228 handles multi-user based sessions allowing for users to trigger the start of a multimedia content, i.e., initiate the display of the visual component of the multimedia content on the display 220, or join in on an ongoing multimedia content. This allows for two people standing side-by-side to watch two different multimedia contents or watch the same multimedia content, creating their own unique interactive listening experience.

The synchronization player application 228 also stores the Global Positioning System (GPS) location of the electronic display device 206, which is transmitted back to the synchronization management server 110 for location based experience offerings. The synchronization player application 228 creates log files of various types of data, which can include the following: (1) who has listened to a particular multimedia content played on the electronic display device 206; (2) how long did that viewer listen to the particular multimedia content; (3) what type of a wireless computing device did the viewer use to log into or connect to the electronic display device; (4) what other applications does the viewer have on the wireless computing device; and (5) what version of a synchronization client application (described below) is the viewer running on the wireless computing device. These various types of data can be extracted from the wireless computing device when that device connects with the electronic display device 206. In an embodiment, these log files are Extensible Markup Language (XML) files that are transmitted and stored in the synchronization management server 110 for various different usage scenarios, which are described below.

Figure 3:
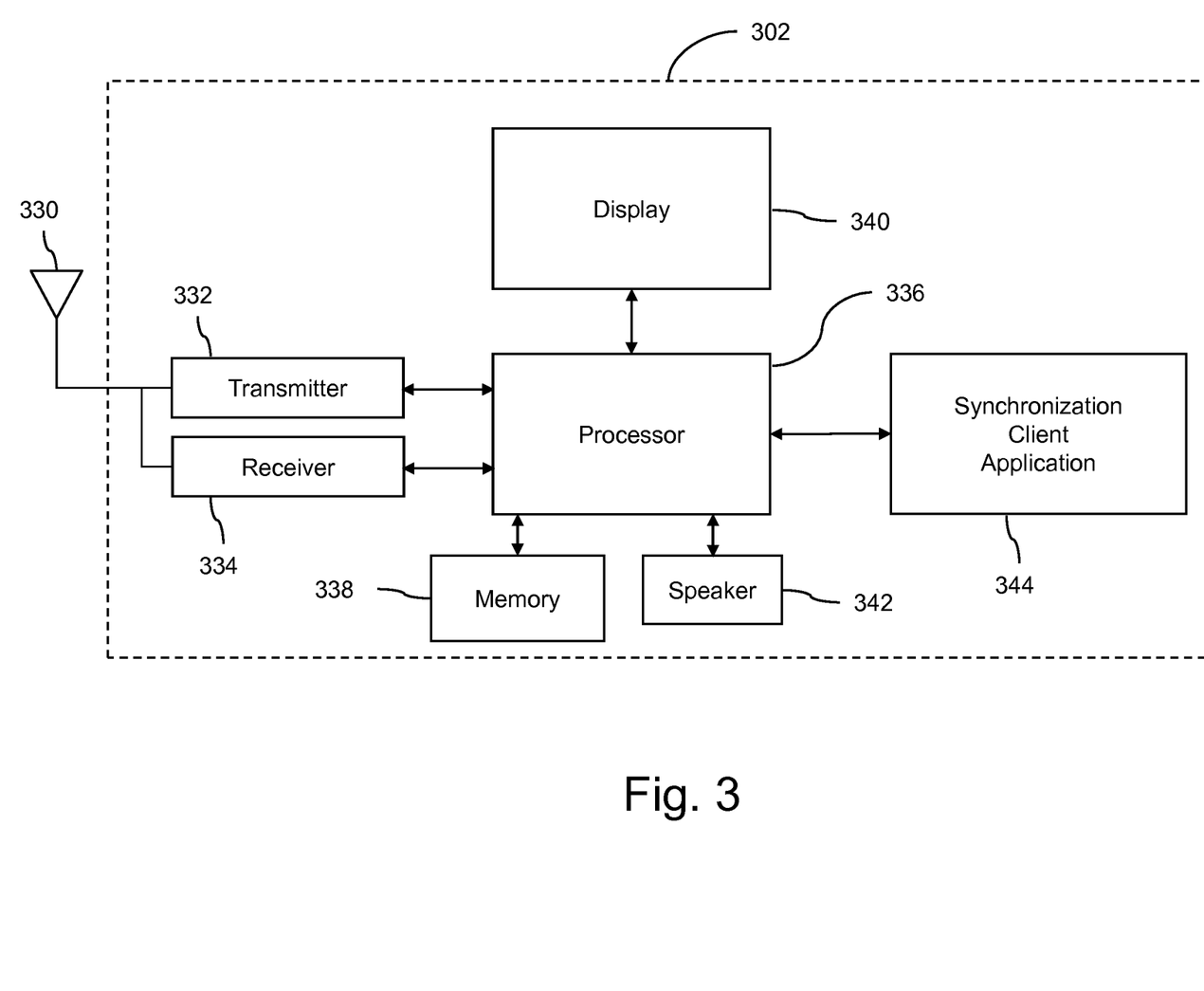
FIG. 3 is a block diagram of an example of wireless computing devices in the system of FIG. 1 in accordance with an embodiment of the invention.

Turning now to FIG. 3, components of a wireless computing device 302 in accordance with an embodiment of the invention are shown. The wireless computing device 302 is an example of the wireless computing devices 102 shown in FIG. 1. As shown in FIG. 3, the wireless computing device 302 includes at least one antenna 330, a transmitter 332, a receiver 334, a processor 336, memory 338, a display 340, a speaker 342 and a synchronization client application 344. The transmitter 332 and the receiver 334 are connected to the antenna 330. The transmitter 332 is configured to transmit outgoing signals to the network 104 using the antenna 330. The receiver 334 is configured to receive incoming signals from the network 104 using the antenna 330. The transmitter 332 and the receiver 334 can be configured to transmit and receive signals according to any known wireless protocol. In an embodiment, the transmitter 332 and the receiver 334 may be implemented as a WiFi™ chipset. The display 340 can be any type of display commonly found in portable or mobile devices, such as an LCD display. In some embodiments, the display 340 may be a touch screen display. The speaker 342 can be any type of an audio output device. In some embodiments, the wireless computing device 302 may include a jack so that a headphone or an earphone can be used rather than the speaker 342 of the wireless computing device. The wireless computing device 302 may include other conventional components commonly found in wireless mobile devices, such as a camera and cell phone components, which are not illustrated or described herein so as to not obscure the inventive features of the wireless computing device 302.

The synchronization client application 344 of the wireless computing device 302 operates to allow a user to select a particular electronic display device to listen to the audio component of a multimedia content being played on that electronic display device. In an embodiment, the synchronization client application 344 may be configured to leverage Location Based Services (LBS) to create a unique user experience based the current location of the wireless computing device. When authorized by the user of the wireless computing device 302, the synchronization client application 344 may use LBS, which connects to the synchronization management server 110 and cross references data from the synchronization management server what electronic display devices are within that user's vicinity, i.e., the vicinity of the wireless computing device 302. That is, the LBS uses the current location of the wireless computing device 302 and locations of the electronic display devices stored in the synchronization management server 110 to determine which electronic display devices are within a predefined surrounding area of the wireless computing device. After the LBS has determined which electronic display devices are in the vicinity of the wireless computing device 302, this information is relayed to the synchronization client application 344. The synchronization client application 344 can then utilize the information to provide a user interface on the display that is customized to the current location of the wireless computing device. The user interface can then be used by the user to identify and select the electronic display device with which the user would like to interact. In some embodiments, the current location of the wireless computing device 302 may be used so that a nearby electronic display device plays a particular multimedia content or makes available for play a particular multimedia content based on the current location of the wireless computing device. As an example, in a museum environment, if the wireless computing device 302 is near one of two exhibits, a nearby electronic display device may play or make available for play a multimedia content relevant to the exhibit closest to the wireless computing device.

In an embodiment, the synchronization client application 344 is configured to use information from the LBS to provide a user interface with an augmented reality. As an example, Google Streetview currently allows users on their mobile devices to view a virtual tour of their surroundings based on their GPS data derived from their mobile devices. In this example, the synchronization client application 344 may overlay the location information of the electronic display devices into the HTML interface of the Google Streetview, which allows the user to choose the electronic display device for interaction through Google Streetview.

In an embodiment, the synchronization client application 344 sits on various pieces of hardware of the wireless computing device. The synchronization client application 344 utilizes Real Time Streaming Protocol (RTSP) stack along with hardware acceleration buffers within the Application Programming Interface (API) of the wireless computing device, which can vary depending on the architecture of the wireless computing device 302. Thus, the synchronization client application 344 provides an audio buffering for the received audio component data from the connected electronic display device to ensure synchronization between the audio component played on the wireless computing device 302 and the visual component played on the electronic display device, where the audio buffering is customized for the hardware and software architecture of the wireless computing device 302.

In operation, the synchronization client application 344 initializes a user session with the synchronization player application in the selected electronic display device for a desired multimedia content and creates a unique session identification (ID). As a result, connectivity between the synchronization client application 344 and the synchronization player application is initialized. In an embodiment, the connectivity between the synchronization client application 344 and the target synchronization player application is achieved by connecting to an IP address of the synchronization player application. The session ID is used to monitor data traffic along with packet loss and other pertinent data. The synchronization client application 344 utilizes RTSP streams and monitors timing functions in order to calculate latency throughout the synchronization process. In an embodiment, the synchronization client application 344 provides a user interface with volume control. In some embodiments, multiple audio streams of different languages for a single multimedia content may be provided by a synchronization player application of an electronic display device. In these embodiments, the synchronization client application 344 may provide an option on a user interface for the user of the wireless computing device 302 to select the audio stream of a particular language so that the user can listen to the audio component in a desired language. As an example, the synchronization player application may provide the multiple audio streams of different languages for the single multimedia content on different IP addresses. In this example, the synchronization client application 344 may connect to a particular IP address that corresponds to the language selected by the user so that the user can listen to the audio component in the desired language.

The synchronization client application 344 may be implemented in the wireless computing device 302 as software, hardware and/or firmware. In some embodiments, the synchronization client application 344 is a program executed by the processor 336, and thus, the functions of the synchronization client application are performed by the processor running the synchronization client application. In an embodiment, the synchronization client application 344 may be downloaded and installed from various mobile portals, i.e., an app store or through a private web server. Thus, the synchronization client application 344 can be distributed to multiple wireless computing devices using the various mobile portals.

The processor 336 of the wireless computing device 302 may be a general-purpose digital processor such as a microprocessor or microcontroller. In other embodiments, the processor 336 may be a special-purpose processor such as a digital signal processor. In other embodiments, the processor 336 may be another type of controller or a field programmable gate array (FPGA). The memory 338 of the wireless computing device 302 can be any type of computer memory, such as read only memory (ROM), flash memory, random access memory (RAM) or a hard disk drive. Although the wireless computing device 302 is shown and described as having one processor and one memory, the wireless computing device may include multiple processors and/or multiple memories in other embodiments.

Turning back to FIG. 1, the advertisement server 108 can be connected to the wireless computing devices 102, the electronic display devices 106 and the synchronization management server 110 via the network 104. The advertisement server 108 operates to gather information from the synchronization player applications of the electronic display devices 106 regarding interactions between the synchronization client applications of the wireless computing devices 102 and the synchronization player applications of the electronic display devices 106. Thus, the advertisement server 108 can provide advertisers with valuable information regarding the impact of their advertisements displayed on one or more of the electronic display devices 106.

Figure 4:
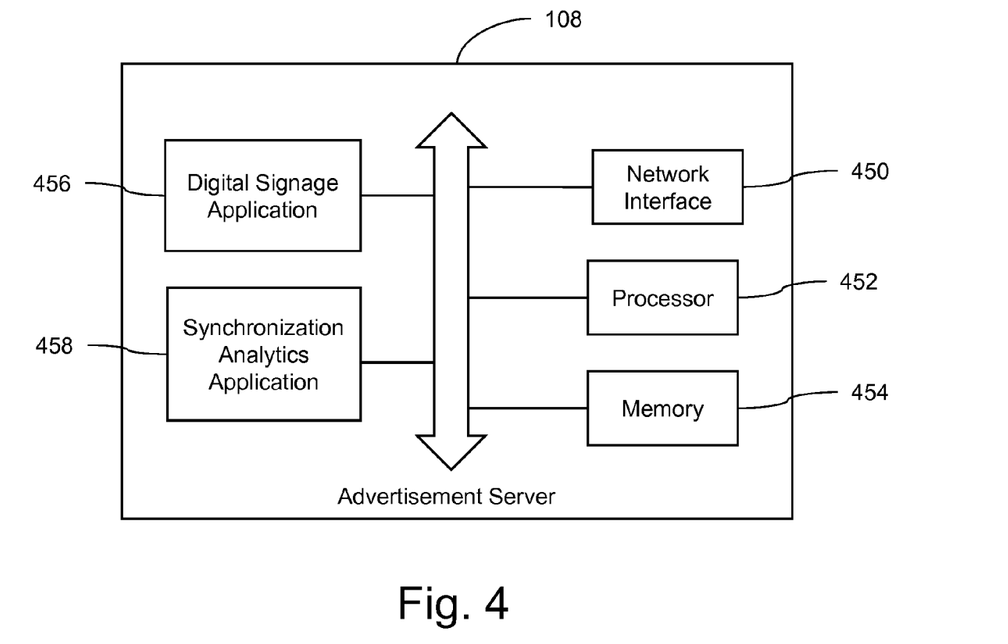
FIG. 4 is a block diagram of components of an advertisement server in the system of FIG. 1 in accordance with an embodiment of the invention.

As shown in FIG. 4, the advertisement server 108 includes components commonly found in a server, such as a network interface 450, at least one processor 452 and at least one memory 454. The network interface 450 enables communications with other devices, such as the electronic display devices 106 and the synchronization management server 110, via the network 104. The processor 452 may include a multifunction processor and/or an application-specific processor. The processor 452 can be any processor commonly found in a server. The memory 454 can be any type of computer memory, such as read only memory (ROM), flash memory, random access memory (RAM) or a hard disk drive.

As shown in FIG. 4, the advertisement server 108 further includes an optional digital signage application 456 and a synchronization analytics application 458. The digital signage application 456 may be a conventional $3^{rd}$ party digital signage application that monitors and controls activities of a digital signage network, which may includes the electronic display devices 106 in some embodiments. The synchronization analytics application 458 is a web based database driven application that ingests multiple XML files from the synchronization player applications of the electronic display devices 106 and cross reference analytics related to interactions of the wireless computing devices 102 with the electronic display devices. The analytics data related to interactions of the wireless computing devices 102 with the electronic display devices 106 may be received directly from the wireless computing devices or from the electronic display devices, e.g., the log files created by the electronic computing devices. This creates a 2 way feedback loop that allows advertisers the ability to monitor and monetize the effectiveness of their multimedia using the multimedia synchronization system 100.

In an embodiment, the synchronization analytics application 458 captures XML data from the digital signage application 456 on the hardware level. The synchronization analytics application 458 also captures analytics from the synchronization player applications of the electronic display devices 106 regarding interactivity between the wireless computing devices 102 and the electronic display devices. The synchronization analytics application 458 stores and correlates the captured data into a database, which may reside in the memory 454 or other memory accessible by the synchronization analytics application, for on demand analytics. The synchronization analytics application 458 can thus provide real time business intelligence dashboards (high level display of acquired data) to advertisers based on the interactivity between the wireless computing devices 102 and the electronic display devices 106, e.g., which multimedia contents were played and which wireless computing devices were used to listen to the audio components of the multimedia contents. Thus, the synchronization analytics application 458 allows for reporting, analysis and dashboarding on a single service oriented architecture. The synchronization analytics application 458 also allows the advertisers to change the multimedia contents being shown in the electronic display devices 106 in real time in response to the acquired data. The synchronization analytics application 458 and/or the digital signage application 456 may be implemented in the advertisement server 108 as software, hardware and/or firmware. In some embodiments, the synchronization analytics application 458 or the digital signage application 456 is a program executed by the processor 452.

Turning back to FIG. 1, the synchronization management server 110 is connected to the electronic display devices 106 and the advertisement server 108 via the network 104. The synchronization management server 110 operates as the server backbone that monitors various functions of the multimedia synchronization system 100. The synchronization management server is web based architecture that handles all reporting of the synchronization system and licensing.

Figure 5:
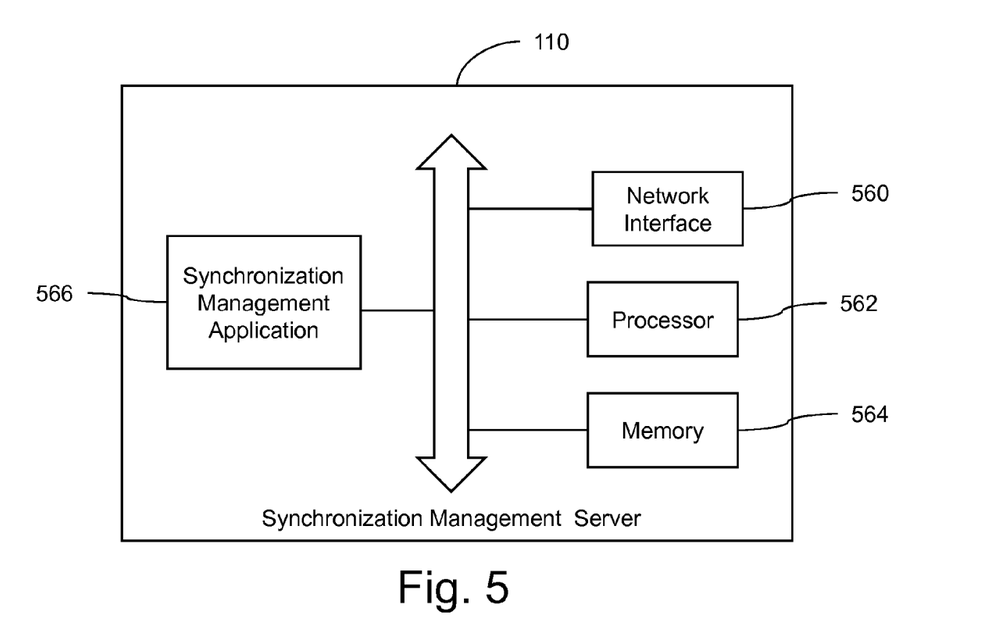
FIG. 5 is a block diagram of components of a synchronization management server in the system of FIG. 1 in accordance with an embodiment of the invention.

As shown in FIG. 5, the synchronization management server 110 includes components commonly found in a server, such as, a network interface 560, at least one processor 562 and at least one memory 564. These components are similar in structure and function to the components in the advertisement server 108.

As shown in FIG. 5, the synchronization management server 110 further includes a synchronization management application 566. The synchronization management application 566 monitors various functions of the multimedia synchronization system 100 and handle all reporting of the synchronization system and licensing. In some embodiments, the synchronization management application 566 may manage multimedia contents that are available to be played on the electronic display devices 106. These multimedia contents may be stored in the memory 564 or any other memory accessible by the synchronization management application 566. The stored multimedia content may include various levels of metadata. The synchronization management application 566 may be implemented in the advertisement server as software, hardware and/or firmware. In some embodiments, the synchronization management application 566 is a program executed by the processor 562. In an alternative embodiment, the synchronization management application 566 of the synchronization management server 110 and the synchronization analytics application 458 and the digital signage application 456 of the advertisement server 108 may reside in a single server.

Figure 6:
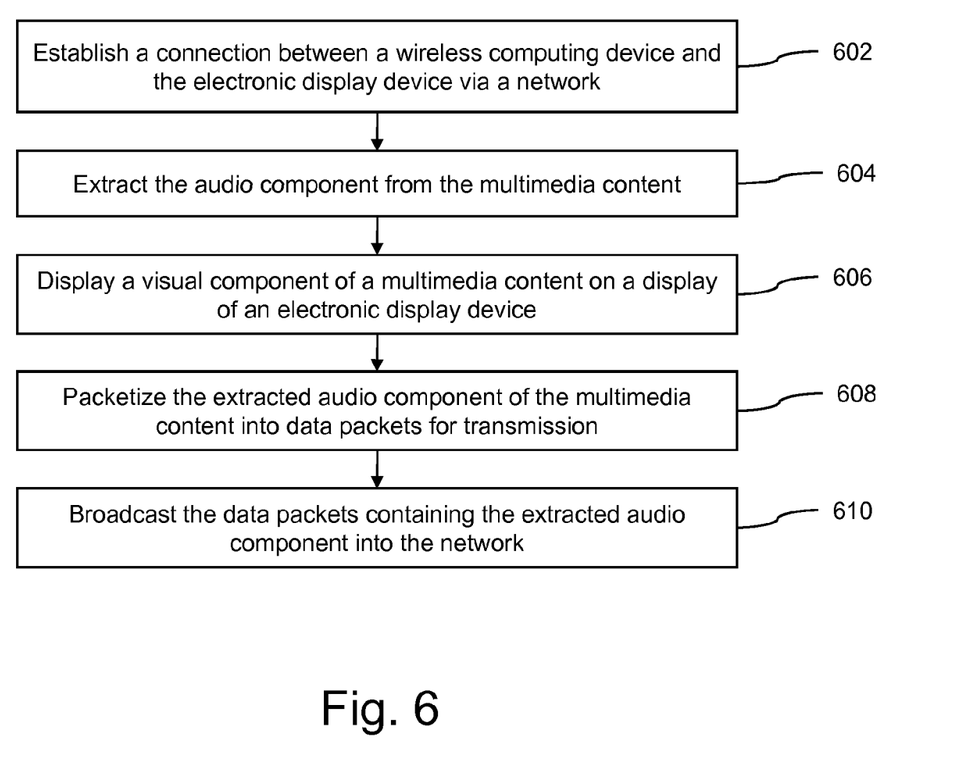
FIG. 6 is a process flow diagram of a method for providing an audio component of a multimedia content playing on an electronic display device to one or more wireless computing devices in accordance with another embodiment of the invention.

A method for providing an audio component of a multimedia content playing on an electronic display device to one or more wireless computing devices in accordance with an embodiment of the invention is described with reference to a process flow diagram of FIG. 6. At block 602, a connection between a wireless computing device and the electronic display device via a network is established. At block 604, a visual component of the multimedia content is displayed on a display of the electronic display device. At block 606, the audio component is extracted from the multimedia content. At block 608, the extracted audio component of the multimedia content is packetized into data packets for transmission. At block 610, the data packets containing the extracted audio component are broadcast into the network so that the data packets can be received by the wireless computing device to play the audio component of the multimedia content in synchronization with the visual component of the multimedia content being displayed on the display of the electronic display device.

Although the operations of the methods herein are shown and described in a particular order, the order of the operations of the methods may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more feature.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A network device, comprising:
    a network interface configured to communicate on a network; and
    a processor configured to extract an audio component from a multimedia content and direct the audio component to the network interface such that the audio component may be transmitted to and received by a wireless device and played by the wireless device in synchronization with a visual component of the multimedia content playing on a display, wherein the processor is configured to establish a communication connection between the network device and the wireless device and log a plurality of data of the wireless device, wherein a first datum of the plurality of data identifies the multimedia content from which the audio component was extracted, and a second datum of the plurality of data identifies how long a user played the audio component on the wireless device.

2. The network device of claim 1, wherein a third datum of the plurality of data identifies the audio component played by the wireless device.

3. The network device of claim 1, wherein a third datum of the plurality of data identifies the user that played the audio component.

4. The network device of claim 1, wherein a third datum of the plurality of data identifies a global positioning system (GPS) location of the wireless device.

5. The network device of claim 1, wherein the wireless device has a type and a third datum of the plurality of data identifies the type of the wireless device.

6. The network device of claim 1, wherein the wireless device is running a synchronization client application having a version and a third datum of the plurality of data identifies the version of the synchronization client application.

7. The network device of claim 1, wherein a fourth datum of the plurality of data identifies another application running on the wireless device.

8. The network device of claim 1, wherein the multimedia content is customized, at least in part, using at least one datum of the plurality of data.

9. A non-transient computer-readable storage medium with an executable application stored thereon, wherein the application instructs a processor to perform the steps of:
    establishing a communication connection between a network interface and a wireless device;
    extracting an audio component from a multimedia content;
    logging a plurality of data of the wireless device, wherein a first datum of the plurality of data identifies the multimedia content from which the audio component was extracted; and
    directing the audio component to the network interface such that the audio component may be transmitted to and received by the wireless device and played by the wireless device in synchronization with a visual component of the multimedia content playing on a display, wherein a second datum of the plurality of data identifies how long a user played the audio component on the wireless device.

10. The medium of claim 9, wherein a third datum of the plurality of data identifies the audio component played by the wireless device.

11. The medium of claim 9, wherein a third datum of the plurality of data identifies the user that played the audio component.

12. The medium of claim 9, wherein a third datum of the plurality of data identifies a global positioning system (GPS) location of the wireless device.

13. The medium of claim 9, wherein the wireless device has a type and a third datum of the plurality of data identifies the type of the wireless device.

14. The medium of claim 9, wherein the wireless device is running a synchronization client application having a version and a third datum of the plurality of data identifies the version of the synchronization client application.

15. The medium of claim 14, wherein a fourth datum of the plurality of data identifies another application running on the wireless device.

16. The medium of claim 9, wherein the multimedia content is customized, at least in part, using at least one datum of the plurality of data.

17. A method of a processor, comprising the steps of:
establishing a communication connection between a network interface and a wireless device;
extracting an audio component from a multimedia content;
logging a plurality of data of the wireless device, wherein a first datum of the plurality of data identifies the multimedia content from which the audio component was extracted;
and
directing the audio component to the network interface such that the audio component may be transmitted to and received by the wireless device and played by the wireless device in synchronization with a visual component of the multimedia content playing on a display, wherein a second datum of the plurality of data identifies how long a user played the audio component on the wireless device.

18. The method of claim 17, wherein a third datum of the plurality of data identifies the audio component played by the wireless device.

19. The method of claim 17, wherein a third datum of the plurality of data identifies the user that played the audio component.

20. The method of claim 17, wherein a third datum of the plurality of data identifies a global positioning system (GPS) location of the wireless device.

21. The method of claim 17, wherein the wireless device has a type and a third datum of the plurality of data identifies the type of the wireless device.

22. The method of claim 17, wherein the wireless device is running a synchronization client application having a version and a third datum of the plurality of data identifies the version of the synchronization client application.

23. The method of claim 22, wherein a fourth datum of the plurality of data identifies another application running on the wireless device.

24. The method of claim 17, wherein the multimedia content is customized, at least in part, using at least one datum of the plurality of data.

\* \* \* \* \*